United States Patent [19]
Gillberg-LaForce et al.

[11] Patent Number: 6,060,410
[45] Date of Patent: May 9, 2000

[54] COATING OF A HYDROPHOBIC POLYMER SUBSTRATE WITH A NONSTOICHIOMETRIC POLYELECTROLYTE COMPLEX

[76] Inventors: Gunilla Elsa Gillberg-LaForce, 2715 Misty Morning La., Roswell, Ga. 30076; Elizabeth Deibler Gadsby, 5338 Timber Ridge Rd., Marietta, Ga. 30068

[21] Appl. No.: 09/064,243

[22] Filed: Apr. 22, 1998

[51] Int. Cl.$^7$ ................................................. B32B 27/02
[52] U.S. Cl. ........................ 442/118; 442/170; 442/171; 442/400; 442/401; 428/523; 427/384; 427/394
[58] Field of Search .................................... 442/118, 170, 442/171, 400, 401; 428/523; 427/394, 384

[56] References Cited

U.S. PATENT DOCUMENTS

| | | | |
|---|---|---|---|
| Re. 31,822 | 2/1985 | Cannady, Jr. et al. | 128/156 |
| 2,794,010 | 5/1957 | Jackson | 260/45.5 |
| 2,949,384 | 8/1960 | Harris | 117/93 |
| 3,016,599 | 1/1962 | Perry, Jr. | 28/78 |
| 3,098,370 | 7/1963 | Poole et al. | |
| 3,341,394 | 9/1967 | Kinney | 161/72 |
| 3,467,604 | 9/1969 | Michaels | 260/2.5 |
| 3,546,142 | 12/1970 | Michaels | 260/2.1 |
| 3,655,862 | 4/1972 | Dorschnet et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,755,527 | 8/1973 | Keller et al. | 264/210 |
| 3,802,817 | 4/1974 | Matsuki et al. | 425/66 |
| 3,808,305 | 4/1974 | Gregor | 264/331 |
| 3,816,159 | 6/1974 | Newman | 117/28 |
| 3,849,241 | 11/1974 | Butin et al. | 161/169 |
| 3,853,651 | 12/1974 | Porte | 156/73.6 |
| 3,917,574 | 11/1975 | Gibbs et al. | 260/79.3 |
| 3,927,236 | 12/1975 | Shultz | 423/304 |
| 3,927,242 | 12/1975 | Rembaum et al. | 428/411 |
| 3,950,296 | 4/1976 | Kangas et al. | 260/29.6 PT |
| 3,966,679 | 6/1976 | Gross | 260/47 EA |
| 3,978,185 | 8/1976 | Butin et al. | 264/93 |
| 3,980,663 | 9/1976 | Gross | 260/29.6 TA |
| 3,993,616 | 11/1976 | Gross | 260/29.4 UA |
| 4,014,798 | 3/1977 | Rembaum | 210/500 |
| 4,017,653 | 4/1977 | Gross | 428/385 A |
| 4,041,020 | 8/1977 | Gross | 260/79.3 |
| 4,043,952 | 8/1977 | Gansalw et al. | 260/17.4 ST |
| 4,056,502 | 11/1977 | Gross | 260/29.6 N |
| 4,057,521 | 11/1977 | Gross | 260/29.6 HN |
| 4,064,605 | 12/1977 | Akiyama et al. | 28/103 |
| 4,071,650 | 1/1978 | Gross | 428/260 |
| 4,076,673 | 2/1978 | Burkholder, Jr. | 260/29.2 EP |
| 4,076,928 | 2/1978 | Gross | 526/240 |
| 4,079,029 | 3/1978 | Gross | 260/29.6 TA |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,117,184 | 9/1978 | Erickson et al. | 428/224 |
| 4,118,531 | 10/1978 | Hauser | 428/224 |
| 4,154,898 | 5/1979 | Burkholder, Jr. | 428/500 |
| 4,293,609 | 10/1981 | Erickson | 428/246 |
| 4,301,067 | 11/1981 | Koshugi | 260/112.5 R |
| 4,310,593 | 1/1982 | Gross | 428/290 |
| 4,340,563 | 7/1982 | Appel et al. | 264/518 |
| 4,404,314 | 9/1983 | Jabloner | 524/519 |
| 4,405,297 | 9/1983 | Appel et al. | 425/72 |
| 4,424,247 | 1/1984 | Erickson | 428/138 |
| 4,434,204 | 2/1984 | Hartman et al. | 428/198 |

(List continued on next page.)

FOREIGN PATENT DOCUMENTS

| | | |
|---|---|---|
| 523606 | 2/1956 | Belgium . |
| 17097 | 7/1914 | United Kingdom . |
| 1131212 | 10/1968 | United Kingdom . |

OTHER PUBLICATIONS

Abstract of Japanese 49–1859 dated May 10, 1974.
Abstract of Japanese 360038064 dated Feb. 27, 1985.
Abstract of Japanese 5–154441 dated Jun. 22, 1993.
Abstract of USSR 523722 dated Aug. 1976.
"Manufacture of Superfine Organic Fibers", by V.A. Wente et al., Nancy Research Laboratory, Washington, D.C., NRL Report 4364 (111437), May 25, 1994, US Dept. of Commerce, Office of Technical Services.
"Melt Blowing—A One–Step Web Process for New Nonwoven Products" by R.R. Butin et al., Journal of the Technical Association of the Pulp and Paper Industry, vol. 56, No. 4, pp. 74–77 (1973).
Physicochemical Basis and the Prospects of Using Soluble Interpolyelectrolyte Complexes (Review) by V.A. Kabanov, Polymer Science, vol. 36, No. 2, Feb. 1994, pp. 143–156.
"Superfine Thermoplastic Fibers" by V.A. Wente, Industrial and Engineering Chemistry, vol. 48, No. 8, pp. 1342–1346 (1956).
"The Water Repellency of Fabrics and a New Water Repellancy Test" by A. Cassie et al., J. Textile Inst., Ch. 8, Apr. 1945, p. T67–T90.
"Wettability of Porous Surfaces" by A. Cassie et al., Trans. Far. Soc., vol. 40, 1944, p. 546–7.

*Primary Examiner*—Christopher Raimund
*Attorney, Agent, or Firm*—William E. Maycock

[57] ABSTRACT

A method of coating the surface of a substrate, such as a film or a fibrous web, which is composed of a hydrophobic polymer. The method involves providing a solution of a first polyelectrolyte having ionizable groups and a solution of a second polyelectrolyte having ionizable groups. The two solutions then are mixed under conditions adapted to result in the formation of a nonstoichiometric polyelectrolyte complex. Finally, the surface of the hydrophobic polymer substrate is contacted with a solution of the complex under conditions sufficient to result in the coating of the surface of the substrate with the complex. The ionizable groups of the second polyelectrolyte have a latent charge opposite the latent charge of the ionizable groups of the first polyelectrolyte. Moreover, the amounts of the first and second polyelectrolytes are selected to give a ratio of the number of ionizable groups in the first polyelectrolyte to the number of ionizable groups in the second polyelectrolyte of at least about 2, and the molecular weight of the first polyelectrolyte is at least about 40,000 daltons and at least about 2 times the molecular weight of the second polyelectrolyte.

23 Claims, No Drawings

U.S. PATENT DOCUMENTS

| | | | |
|---|---|---|---|
| 4,435,172 | 3/1984 | Gross | 604/368 |
| 4,444,830 | 4/1984 | Erickson | 428/246 |
| 4,463,040 | 7/1984 | Kisler | 427/445 |
| 4,488,969 | 12/1984 | Hou | 210/679 |
| 4,500,585 | 2/1985 | Erickson | 428/152 |
| 4,501,835 | 2/1985 | Berke | 524/32 |
| 4,548,847 | 10/1985 | Aberson et al. | 428/74 |
| 4,552,781 | 11/1985 | Cannady, Jr. et al. | 427/57 |
| 4,588,537 | 5/1986 | Klaase et al. | 264/22 |
| 4,592,815 | 6/1986 | Makao | 204/165 |
| 4,627,811 | 12/1986 | Greiser et al. | 425/72 S |
| 4,644,045 | 2/1987 | Fowells | 526/348 |
| 4,645,789 | 2/1987 | Dabi | 524/379 |
| 4,663,220 | 5/1987 | Wisneski et al. | 428/22 |
| 4,728,689 | 3/1988 | Saito | 524/507 |
| 4,888,238 | 12/1989 | Katz et al. | 428/378 |
| 4,933,390 | 6/1990 | Dabi et al. | 524/808 |
| 4,944,963 | 7/1990 | Dabi et al. | 427/195 |
| 4,957,816 | 9/1990 | Adkins | 428/411.1 |
| 4,970,260 | 11/1990 | Lundberg et al. | 524/516 |
| 5,085,775 | 2/1992 | Swamikannu | 210/500.27 |
| 5,212,000 | 5/1993 | Rose et al. | 428/34.7 |
| 5,252,218 | 10/1993 | Putzier | 428/74 |
| 5,252,660 | 10/1993 | Hazan et al. | 524/504 |
| 5,262,193 | 11/1993 | Louks et al. | 427/8 |
| 5,376,402 | 12/1994 | Louks et al. | 427/8 |
| 5,605,953 | 2/1997 | Esser | 524/522 |
| 5,618,622 | 4/1997 | Gillberg-Laforce et al. | 428/357 |

COATING OF A HYDROPHOBIC POLYMER SUBSTRATE WITH A NONSTOICHIOMETRIC POLYELECTROLYTE COMPLEX

BACKGROUND OF THE INVENTION

The present invention relates to a surface-modified hydrophobic polymer substrate.

Polymers are used extensively to make a variety of products which include blown and cast films, extruded sheets, injection molded articles, foams, blow molded articles, extruded pipe, monofilaments, and nonwoven webs. Some of these polymers, such as polyolefins, are naturally hydrophobic and without any chemical functionality, and for many uses these properties are either a positive attribute or at least not a disadvantage.

There are a number of uses for polymers, however, where their hydrophobic nature either limits their usefulness or requires some effort to modify the surface characteristics of the shaped articles made therefrom. By way of example, polyolefins, such as polyethylene and polypropylene, are used to manufacture polymeric fabrics which are employed in the construction of such disposable absorbent articles as diapers, feminine care products, incontinence products, training pants, wipes, and the like. Such polymeric fabrics often are nonwoven webs prepared by, for example, such processes as meltblowing, coforming, and spunbonding. Frequently, such polymeric fabrics need to be wettable by water or an aqueous medium. Wettability can be obtained by spraying or otherwise coating (i.e., surface treating or topically treating) the fabric with a surfactant solution during or after its formation, and then drying the web.

Some of the more common topically applied surfactants are nonionic surfactants, such as polyethoxylated octylphenols and condensation products of propylene oxide and ethylene oxide, by way of illustration only. These surfactants are effective in rendering normally hydrophobic polymeric fabrics water wettable. However, the surfactant is readily removed from the fabric, often after only a single exposure to an aqueous liquid. Such surfactants are effective in rendering the hydrophobic polymeric fabric wettable by lowering the surface tension of the aqueous liquid. Such a mechanism must involve at least partial removal of surfactant from the surfaces of the fibers of which the fabric is composed.

Accordingly, there is a need for a method of modifying the surface of a hydrophobic polymer substrate which permits the surface of the substrate to be wettable by water or an aqueous medium, is more durable than the topically applied surfactants employed in the past, and does not significantly lower the surface tension of an aqueous medium to which the coated substrate may be exposed.

SUMMARY OF THE INVENTION

The present invention addresses some of the difficulties and problems discussed above by providing a method for coating a substrate composed of a hydrophobic polymer. The coating permits the surface of the substrate to be wettable by water or an aqueous medium and is more durable than the typical topically applied surfactants employed in the past. The hydrophobic polymer may be, by way of illustration only, a polyolefin. For example, the polyolefin may be polyethylene or polypropylene.

The invention is grounded in the discovery that a nonstoichiometric polyelectrolyte complex is able to form a coating on hydrophobic polymer surfaces to render such surfaces wettable by water. A nonstoichiometric polyelectrolyte complex is formed when a comparatively high molecular weight first polyelectrolyte forms an interpolymeric salt with a lower molecular weight second polyelectrolyte of opposite charge and when the total number of ionic groups in the first polyelectrolyte exceeds that of the complexed second polyelectrolyte. The formation of the complex results in a new polyelectrolyte having both hydrophilic and hydrophobic blocks.

Accordingly, the present invention provides a method of coating the surface of a substrate composed of a hydrophobic polymer. The method involves providing a solution of a first polyelectrolyte having ionizable groups and a solution of a second polyelectrolyte having ionizable groups. The two solutions then are mixed under conditions adapted to result in the formation of a nonstoichiometric polyelectrolyte complex. Finally, the surface of the hydrophobic polymer substrate is contacted with a solution of the nonstoichiometric polyelectrolyte complex under conditions sufficient to result in the coating of the surface of the substrate with the complex. The coating of the complex on the surface of the substrate may be subsequently dried.

The ionizable groups of the second polyelectrolyte have a latent charge opposite the latent charge of the ionizable groups of the first polyelectrolyte. Moreover, the amounts of the first and second polyelectrolytes are selected to give a ratio of the number of ionizable groups in the first polyelectrolyte to the number of ionizable groups in the second polyelectrolyte of at least about 2, and the molecular weight of the first polyelectrolyte is at least about 40,000 daltons and at least about 2 times the molecular weight of the second polyelectrolyte.

By way of example only, the ratio of the number of ionizable groups in the first polyelectrolyte to the number of ionizable groups in the second polyelectrolyte may be in a range of from about 5 to about 10. As another example, the hydrophobic polymer may be a polyolefin, such as polyethylene and polypropylene. As a further example, the coating of the nonstoichiometric polyelectrolyte complex on the surface of the substrate may be crosslinked.

Each of the first and second polyelectrolytes may be either a strong polyelectrolyte or a weak polyelectrolyte, provided both are not strong polyelectrolytes. For example, the first polyelectrolyte may be a strong polyelectrolyte and the second polyelectrolyte may be a weak polyelectrolyte. As another example, the first polyelectrolyte may be a weak polyelectrolyte and the second polyelectrolyte may be a strong polyelectrolyte. As a further example, the first polyelectrolyte may be a weak polyelectrolyte and the second polyelectrolyte may be a weak polyelectrolyte.

Examples of first and second polyelectrolytes include, respectively, by way of illustration only, chitosan and poly(acrylic acid); chitosan and poly(methacrylic acid); poly(diallyl dimethyl ammonium chloride) and poly(acrylic acid) or the sodium salt of poly(acrylic acid) or combinations thereof; poly(methacryl oxyethyl trimethyl ammonium bromide) and poly(acrylic acid); poly(butyl acrylate-methacryl oxyethyl trimethyl ammonium bromide) and poly(acrylic acid) or the sodium salt of poly(acrylic acid) or combinations thereof; poly(butyl acrylate-methacryl oxyethyl trimethyl ammonium bromide) and the sodium salt of poly(acrylic acid); N-vinylpyrrolidone/dimethylaminoethyl methacrylate quaternized copolymer and is poly(acrylic acid); and poly(acrylic acid) and poly(ethyleneimine).

The molecular weight of the first polyelectrolyte will be at least about 2 times that of the second polyelectrolyte. For example, the molecular weight of the first polyelectrolyte may be at least about 3 times that of the second polyelectrolyte.

In general, the substrate may be any shaped article. For example, the substrate may be a film. As another example, the substrate may be fibers. Such fibers desirably will be in the form of a fibrous web. Examples of fibrous webs include woven and nonwoven fabrics. Examples of nonwoven fabrics or webs include meltblown and spunbond fabrics or webs.

The present invention also provides a coated substrate. The substrate is composed, in whole or in part, of a hydrophobic polymer. A substantially uniform coating of the polyelectrolyte complex described above is on the surface of the substrate.

DETAILED DESCRIPTION OF THE INVENTION

As used herein, the terms "hydrophobic polymer substrate" and "substrate composed of a hydrophobic polymer" are synonymous and are meant to include any shaped article, provided it is composed, in whole or in part, of a hydrophobic polymer. For example, the substrate may be a hydrophobic polymer film or hydrophobic polymer fibers, such as fibers which have been formed into a sheet-like material, such as a fibrous web. Examples of a fibrous web include, by way of illustration only, a woven or nonwoven fabric or web. The fibrous web desirably will be a nonwoven web, such as, but not limited to, a meltblown web or a spunbond web. The substrate also may be a laminate of two or more layers of a sheet-like material. For example, the layers may be independently selected from the group consisting of meltblown webs and spunbond webs. However, other sheet-like materials may be used in addition to, or instead of, meltblown and spunbond webs. In addition, the layers of the laminate may be prepared from the same hydrophobic polymer or different hydrophobic polymers.

The term "hydrophobic polymer" is used herein to mean any polymer resistant to wetting, or not readily wet, by water, i.e., having a lack of affinity for water. Examples of hydrophobic polymers include, by way of illustration only, polyolefins, such as polyethylene, poly(isobutene), poly (isoprene), poly(4-methyl-1-pentene), polypropylene, ethylene-propylene copolymers, ethylene-propylene-hexadiene copolymers, and ethylene-vinyl acetate copolymers; metallocene polyolefins, such as ethylene-butene copolymers and ethylene-octene copolymers; styrene polymers, such as poly(styrene), poly(2-methylstyrene), and styrene-acrylonitrile copolymers having less than about 20 mole-percent acrylonitrile; vinyl polymers, such as poly (vinyl butyrate), poly(vinyl decanoate), poly(vinyl dodecanoate), poly(vinyl hexadecanoate), poly(vinyl hexanoate), poly(vinyl octanoate), and poly (methacrylonitrile); acrylic polymers, such as poly(n-butyl acetate), and poly(ethyl acrylate); methacrylic polymers, such as poly(benzyl methacrylate), poly(n-butyl methacrylate), poly(isobutyl methacrylate), poly(t-butyl methacrylate), poly(t-butylaminoethyl methacrylate), poly (do-decyl methacrylate), poly(ethyl methacrylate), poly(2-ethylhexyl methacrylate), poly(n-hexyl methacrylate), poly (phenyl methacrylate), poly(n-propyl methacrylate), and poly(octadecyl methacrylate); polyesters, such a poly (ethylene terephthalate) and poly(butylene terephthalate); and polyalkenes and polyalkynes, such as polybutylene and polyacetylene.

The term "polyolefin" is used herein to mean a polymer prepared by the addition polymerization of one or more unsaturated monomers which contain only carbon and hydrogen atoms. Examples of such polyolefins include polyethylene, polypropylene, poly(1-butene), poly(2-butene), poly(1-pentene), poly(2-pentene), poly(3-methyl-1-pentene), poly(4-methyl-1-pentene), and the like. In addition, such term is meant to include blends of two or more polyolefins and random and block copolymers prepared from two or more different unsaturated monomers. Because of their commercial importance, the most desired polyolefins are polyethylene and polypropylene.

The hydrophobic polymer also may contain minor amounts of additives as is customary in the art. For example, the hydrophobic polymer may contain pigments, delustrants, antioxidants, antistatic agents, stabilizers, oxygen scavengers, and the like.

As used herein, the term "polyelectrolyte" denotes a class of macromolecular compounds which, when dissolved in a suitable solvent, such as water, spontaneously acquire or can be made to acquire a large number of elementary charges distributed along the macromolecular chain. When the polyelectrolyte spontaneously acquires its maximum number of charges, it is referred to herein as a "strong polyelectrolyte." When the polyelectrolyte is only partially charged when dissolved in a pure solvent, it is referred to herein as a "weak polyelectrolyte." Both weak and strong polyelectrolytes may have either anionic charges or cationic charges. The term is intended to encompass a single polyelectrolyte or a mixture of two or more polyelectrolytes of the same type (i.e., anionic or cationic polyelectrolytes).

The term "latent charge" is used herein in reference to the charge which a polyelectrolyte exhibits in an aqueous solution. In the dry state, the ionizable groups are neutral; consequently, the polyelectrolyte per se does not have a charge. For this reason, the ionizable groups of the polyelectrolyte are referred to as having a "latent charge."

A particular polyelectrolyte, when placed in an aqueous medium, typically, contains a number of ionized groups having the same charge. That is, such groups are either positive or negative. The term "opposite" in reference to such charge (the "latent charge" in the dry or nonhydrated state), simply means that if one of the first and second polyelectrolytes has a positive charge in solution (or a positive latent charge), the other must have a charge which is opposite, i.e., a negative charge (or a negative latent charge). Positively charged and negatively charged ionized groups sometimes are referred to herein as cationic groups and anionic groups, respectively, or variations thereof.

It should be noted that the term "polyelectrolyte" also is intended to encompass a polyelectrolyte having both cationic and anionic groups, provided that one type of such groups is present in an amount sufficient to permit the formation of a nonstoichiometric polyelectrolyte complex as described herein; that is, one type of ionizable group must be predominant. Such a polyelectrolyte may be, by way of illustration, a block, graft, or random copolymer. For example, the ratio of the number of predominant ionizable groups to the number of ionizable groups having an opposite charge may be at least about 2. In addition, the term is intended to include a single polyelectrolyte having both types of ionizable groups, a mixture of two or more polyelectrolytes having the same type of predominant ionizable groups, and a mixture of two or more polyelectrolytes in which at least one polyelectrolyte contains both types of ionizable groups and at least one polyelectrolyte contains only one type of ionizable groups, provided the predominant ionizable groups and the one type of ionizable groups, respectively, are of the same type (i.e., either anionic or cationic). Although coming within the scope of the present invention, polyelectrolytes containing both types of groups are not desired as they may form internal or intramolecular complexes and/or interfere with complex formation with the other polyelectrolyte required by the present invention.

Examples of strong polyelectrolytes include, by way of illustration only, poly(ethylenesulfonic acid), poly(vinylsulfuric acid), poly(styrenesulfonic acid), poly(vinylphenylsulfuric acid), poly(vinyl-N-alkylpyridinium salt), poly(methylene)-N,N-dimethylpiperidinium salt, poly(vinylbenzyltrimethyl ammonium salt), poly(dimethyl diallyl ammonium chloride), poly(N,N,N',N'-tetramethyl-N-P-xylylenepropylene diammonium chloride), N-vinylpyrrolidone/dimethylaminoethyl methacrylate quarternized copolymer, poly(N-ethyl-4-vinylpyridinium bromide), poly(vinyl-butylpyridinium bromide), poly(methacryloxyethyl trimethyl ammonium bromide), poly(butyl acrylate-methacryl oxyethyl trimethyl ammonium bromide), and poly(vinyl-N-methylpyridinium bromide). Examples of weak polyelectrolytes include, again by way of illustration only, poly(acrylic acid), poly(methacrylic acid), poly(maleic acid-co-alkene), poly(maleic acid-co-vinyl alkyl ether), poly(glutamic acid), poly(vinylamine), polyethyleneimine, chitosan, glycol chitosan, polylysine, sodium carboxymethyl cellulose, sodium carboxymethyl-hydroxyethyl cellulose, dextran sulfates, hyaluronic acid, heparin, chondroitin sulfate, poly(galacturonic acid), and poly(glutamic acid).

As used herein, the term "molar ratio" is used in reference to the ionizable groups in the first and second polyelectrolytes. A polyelectrolyte typically is composed, at least in part, of a number of repeating units, each of which contains an ionizable group. The molar ratio is the ratio of the number of moles of repeat units having ionizable groups in the first polyelectrolyte to the number of moles of repeat units having ionizable groups in the second polyelectrolyte. Both numbers, of course, are calculated values. Because the denominator of the ratio always is unity, the ratio is expressed as a number, e.g., 20, rather than as a ratio, e.g., 20:1.

The term "durable" as used herein with reference to a coating of a nonstoichiometric polyelectrolyte complex on a substrate means that the coated substrate remains wettable after at least three exposures to an aqueous medium, such as water, saline, and urine and other body fluids.

The term "aqueous medium" is used herein to mean any liquid medium of which water is a major component. Thus, the term includes water per se and aqueous solutions and dispersions. For example, the aqueous medium may be a liquid bodily discharge, such as urine, menses, and saliva.

As used herein, the term "wettable" and variations thereof means wettable by an aqueous medium. A solid surface is regarded as wettable by a liquid if it yields a contact angle with the liquid less than 90°. However, a fibrous material might not be wettable by a liquid even if the individual fibers yield a contact angle less than 90°. This is due to the fact that the surface of a fibrous material is a composite of air surfaces and fiber surfaces. The contact angle of this composite surface is the weighted average of the contact angles to air (180°) and the fiber surfaces. Fabric constructions, therefor, affect wettability. See, for example, A. B. D. Cassie and S. Baxter, *Trans. Far. Soc.,* 40, 546 (1944) and S. Baxter and A. B. D. Cassie, *J. Textile Inst.,* p. 167 (1945). The term "wettable" is used interchangeably with the term "wettable by water" and variations thereof and has the same meaning.

As already stated, the coated substrate of the present invention may include hydrophobic polymer fibers. Such fibers are substantially uniformly coated with a nonstoichiometric polyelectrolyte complex. As an example, the hydrophobic polymer fibers may be polyolefin fibers. For example, the polyolefin fibers may be polyethylene or polypropylene fibers.

The hydrophobic polymer fibers generally may be prepared by any known means. As a practical matter, however, the fibers usually will be prepared by a melt-extrusion process and formed into a fibrous web, such as a nonwoven web. The term "melt-extrusion process" as applied to a nonwoven web is meant to include a nonwoven web prepared by any melt-extrusion process for forming a nonwoven web in which melt-extrusion to form fibers is followed by web formation, typically concurrently, on a foraminous support. The term includes, among others, such well-known processes as meltblowing, coforming, spunbonding, and the like. By way of illustration only, such processes are exemplified by the following references:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3.973,185 to R. R. Butin et al., and 4,663,220 to T. 20 J. Wisneski et al. See, also, V. A. Wente, "Superfine Thermoplastic Fibers", *Industrial and Engineering Chemistry,* Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing - A One-Step Web Process for New Nonwoven Products", *Journal of the Technical Association of the Pulp and Paper Industry,* Vol. 56, No. 4, pp. 74–77 (1973);

(b) coforming references include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

Other methods for preparing nonwoven webs are, of course, known and may be employed. Such methods include air laying, wet laying, carding, and the like. It some cases it may be either desirable or necessary to stabilize the nonwoven web by known means, such as thermal point bonding and hydroentangling. In addition to nonwoven webs, the hydrophobic polymer fibers may be in the form of continuous filaments or staple fibers, as well as woven or knitted fabrics prepared from such continuous filaments or staple fibers.

The coating of nonstoichiometric polyelectrolyte complex is durable to an aqueous medium and does not significantly suppress the surface tension of an aqueous medium with which the coated substrate (e.g., a film or fibers) may come in contact. For example, the coating may be durable to an aqueous medium at a temperature in a range of from about 0° C. to about 70° C. As another example, the surface tension of the aqueous medium may not be suppressed or lowered more than about 10 percent.

Turning now to the method of the present invention, it involves providing a solution of a first polyelectrolyte having ionizable groups and a solution of a second polyelectrolyte having ionizable groups. The two solutions then are mixed under conditions adapted to result in the formation of a nonstoichiometric polyelectrolyte complex. Finally, the surface of the hydrophobic polymer substrate is contacted with a solution of the nonstoichiometric polyelectrolyte complex under conditions sufficient to result in the coating of the surface of the substrate with the nonstoichiometric polyelectrolyte complex. The coating of such complex on the surface of the substrate may be dried.

The ionizable groups of the second polyelectrolyte have a charge opposite the charge of the ionizable groups of the first polyelectrolyte. However, the ionizable groups of either the first or second polyelectrolyte may be anionic or cationic (i.e., negative or positive). Moreover, the amounts of the first and second polyelectrolytes are selected to give a ratio of the number of ionizable groups in the first polyelectrolyte to the number of ionizable groups in the second polyelectrolyte of at least about 2 (referred to herein as the "molar ratio") and the molecular weight of the first polyelectrolyte is at least about 40,000 daltons. For example, the molecular weight of the first polyelectrolyte may be in a range of from about 40,000 to about 1,000,000 daltons.

By way of example only, the ratio of the number of ionizable groups in the first polyelectrolyte to the number of ionizable groups in the second polyelectrolyte may be in a range of from about 2 to about 150. As a further example, such ratio may be in a range of from about 5 to about 50. As another example, the hydrophobic polymer may be a polyolefin, such as polyethylene and polypropylene. As a further example, the coating of the polyelectrolyte complex on the surface of the substrate may be crosslinked.

Each of the first and second polyelectrolytes may be either a strong polyelectrolyte or a weak polyelectrolyte, provided both are not strong polyelectrolytes. For example, the first polyelectrolyte may be a strong polyelectrolyte and the second polyelectrolyte may be a weak polyelectrolyte. As another example, the first polyelectrolyte may be a weak polyelectrolyte and the second polyelectrolyte may be a strong polyelectrolyte. As a further example, the first polyelectrolyte may be a weak polyelectrolyte and the second polyelectrolyte may be a weak polyelectrolyte.

Examples of first and second polyelectrolytes include, respectively, by way of illustration only, chitosan and poly (acrylic acid); chitosan and poly(methacrylic acid), poly (diallyl dimethyl ammonium chloride) and poly(acrylic acid) or the sodium salt of poly(acrylic acid) or combinations thereof; poly(methacryl oxyethyl trimethyl ammonium bromide) and poly(acrylic acid); poly(butyl acrylate-methacryl oxyethyl trimethyl ammonium bromide) and poly (acrylic acid) or the sodium salt of poly(acrylic acid) or combinations thereof; poly(butyl acrylate-methacryl oxyethyl trimethyl ammoniumbromide) and the sodium salt of poly(acrylic acid); N-vinylpyrrolidone/dimethylaminoethyl methacrylate quaternized copolymer and poly(acrylic acid); and poly(acrylic acid) and poly(ethyleneimine).

Desirably, the molecular weight of the first polyelectrolyte will be at least about two times that of the second polyelectrolyte. For example, the molecular weight of the first polyelectrolyte may be at least about three times that of the second polyelectrolyte. As another example, the molecular weight of the second polyelectrolyte may be less than about 50,000 daltons. As a further example, the molecular weight of the second polyelectrolyte may be less than about 30,000 daltons.

Each polyelectrolyte solution typically is prepared by dissolving the polyelectrolyte in deionized water at ambient temperature (about 20–25° C.). The concentration of each polyelectrolyte in its respective solution generally is below the level above which the solution exhibits a significant increase in viscosity. For example, the concentration of each polyelectrolyte may be in a range of from about 0.01 to about 30 percent by weight, based on the weight of water. As another example, the concentration of each polyelectrolyte may be in a range of from about 0.1 to about 10 percent by weight. As a further example, the concentration of each polyelectrolyte may be in a range of from about 0.1 to about 3 percent by weight when the resulting complex solution is to be applied to the fibers of a fibrous web.

The solution of the first polyelectrolyte and the solution of the second polyelectrolyte then are mixed under conditions adapted to result in the formation of a nonstoichiometric polyelectrolyte complex. Such conditions typically include mixing at ambient temperature, although it is not necessary to do so. Such conditions also include intense mixing, such as sonication, high-shear mixing, and the like. The amounts of the two solutions to be mixed depend upon the concentration of polyelectrolyte in each solution and the desired molar ratio of first polyelectrolyte to second polyelectrolyte. In general, such ratio may be in a range of from about 2 to about 10.

The solution of the nonstoichiometric polyelectrolyte complex which results from the mixing step may be used for coating the substrate. That is, it is not necessary to isolate the nonstoichiometric polyelectrolyte complex in a solvent-free condition and redissolve it. The surface of the hydrophobic polymer substrate is contacted with the solution of the nonstoichiometric polyelectrolyte complex under conditions sufficient to result in the coating of the surface of the substrate with the polyelectrolyte complex. Again, such conditions typically involve ambient temperature and a degree of spreading force sufficient to spread the solution of the nonstoichiometric polyelectrolyte complex complex over the surface of the substrate. When the substrate is a film, the requisite degree of spreading force may be achieved, for example, by spreading the solution of the polyelectrolyte complex on the surfaces of the film by means of a doctor blade or Meyer rod. Soaking the film in the solution of the nonstoichiometric polyelectrolyte complex with ultrasonic agitation also may be employed. When the substrate is a fibrous web, sufficient spreading force may be achieved by agitating the substrate in the solution of the nonstoichiometric polyelectrolyte complex, forcing the solution or a foam thereof through the fibrous web by means of suction, and passing the web saturated with the solution of the nonstoichiometric polyelectrolyte complex through a nip formed by a pair of compression rolls.

The present invention is further described by the examples which follow. Such examples, however, are not to be construed as limiting in any way either the spirit or the scope of the present invention. In the examples, the molecular weights given for the polyelectrolytes employed are those reported by the supplier or manufacturer. However, the method for determining a given molecular weight value typically was not given. However, such molecular weight values were assumed to be weight-average molecular weights, but are not referred to specifically as such. All water used to prepare solutions of polyelectrolytes and nonstoichiometric polyelectrolyte complexes was distilled and deionized using a Milli-Q PLUS filtration system. Finally, all amount and concentration percent values are weight-percent values unless stated otherwise.

EXAMPLE 1

Nonstoichiometric polyelectrolyte complexes of chitosan as a cationic first polyelectrolyte and polyacrylic acid (PAA)

or polymethacrylic acid (PMA) as the anionic second polyelectrolyte are described in this example.

Materials

Chitosan was obtained from Fluka BioChemika (Buchs, Switzerland) at low and medium molecular weights of approximately 70,000 and 750,000 daltons, respectively, and from Sigma Chemical Co. (St. Louis, Mo.) as practical grade from crab shells with an unknown molecular weight. According to the manufacturers, the Fluka chitosan is 70–85 percent deacetylated and the Sigma chitosan is 89.3 percent deacetylated. These three chitosans are referred to herein as chitosan A, B, and C, respectively.

Polyacrylic acid (PAA) was obtained from Polysciences, Inc. (Warrington, Pa.) with molecular weights of 3,000, 5,000, and 20,000 daltons (see, e.g., Examples 1 and 3). These are referred to herein as PAA A, B, and C, respectively. The PAA having a 5,000-dalton molecular weight (PAA B) consisted of 50 percent solids by weight in an aqueous solution and the PAA having 20,000- and 3,000-dalton molecular weights (PAA C and A, respectively) were present as sodium salts and consisted of 40 percent solids in an aqueous solution. Polymethacrylic acid (PMA) also was obtained from Polysciences, Inc., and had a 15,000-dalton molecular weight; the polyelectrolyte was supplied as a 30 percent solids aqueous solution in sodium salt form. Apple pectin was obtained from Sigma. Acetic acid (80 percent) was acquired from Fisher Scientific Company (Fair Lawn, N.J.) and lactic acid (85+ percent) and 4-hydroxybutyric acid, sodium salt (99 percent) were acquired from Aldrich Chemical Company (Milwaukee, Wisconsin). Polypropylene and polyethylene films were prepared by Edison Plastics Co. (Newport News, Va.) using Exxon PP3445 and Dow ASPUN 6811A resins, respectively. Polypropylene meltblown webs having basis weights of 1.0 osy (about 34 gsm) and 0.5 osy (about 17 gsm), as well as a 0.8 osy (about 27 gsm) polypropylene spunbond web were the nonwoven fibrous materials employed in this example.

Sample Preparation

Chitosan was weighed and slowly added to a 1 percent to 2.5 percent acetic, lactic, or 4-hydroxybutyric acid solution at a pH of approximately 3 while stirring with a magnetic stir bar. The 4-hydroxybutyric acid was in salt form; therefore, hydrochloric acid was added to bring the pH to 3. Following the addition of the chitosan, the solutions were again adjusted to pH 3, if necessary. Chitosans A, B, and C were used in concentrations ranging from 0.2 to 2 percent. The solution was allowed to stir at ambient temperature overnight to ensure complete dissolution. PAA or PMA was dissolved in water at the same concentration as the chitosan solution. The PMA was in the sodium salt form and was not acidified; consequently, the pH of the PMA solution was about 10, but the pH of the complex solution was approximately 5. The chitosan solution was vigorously mixed with a turbomixer (Example 1) as the PAA or PMA solution was added drop-wise. The mixing intensity of the turbomixer was found to be volume dependent. A liquid depth of 2 inches (about 5 cm) and volumes larger than 50 ml were needed to give optimal mixing. A series of chitosan-PAA polyelectrolyte complexes having molar ratios from 1 to 150 was prepared.

Application Methods

Films were coated by placing several drops of the complex on a film surface and spreading the drops several times with the edge of a disposable glass pipette or glass microscope slide. Typically, nonwovens were treated by soaking in the complex solution for five minutes. Pressure applied with a glass stir rod was necessary to wet out the samples. Sometimes the soak was followed with nipping via an Atlas laboratory wringer having a nip pressure of 30 lbs (about 13.6 kg). In a few cases, the sample was immediately washed in a water bath. In other cases, the samples were washed following drying or not washed at all. The samples were dried by hanging them in a chemical flow hood overnight or by hanging in an oven at 60° C. for four hours.

Sample Characterization

The surface tension of the polyelectrolyte complex solutions was measured using the du Nouy ring method with the Fisher Surface Tensiometer 20. The surface tensions are reported uncorrected for the ring factor. Contact angles of the polyelectrolyte complex solutions on films and of water solutions on complex-coated films were measured with a Rame-Hart, Inc. (Model 100-00-115) goniometer.

The presence of the polyelectrolyte complex on the nonwoven webs was determined by X-ray photoelectron spectroscopy (XPS) with a Surface Science Labs M-Probe ESCA apparatus or field emission scanning electron microscopy (FE-SEM). Coatings on both film and fabric samples were visually observed using either gas-phase iodine or ninhydrin staining. Gas-phase iodine staining involved enclosing the samples in a glass vessel containing several iodine crystals. The iodine was absorbed by the hydrophilic complex coatings and turned the complex an orange-brown. The ninhydrin (Sigma Chemical Co.), which is specific for amines, was sprayed on the samples which were then heated in a 100° C. oven for several hours which resulted in dying the chitosan purple. An Olympus BH-2 light microscope using reflected light at 40–100x magnification and a Bausch & Lomb stereomicroscope at 4x magnification were used to examine the stained samples.

The critical surface tension of wetting (CSTW) of the coated nonwoven fabrics was evaluated with a Politest surface tension liquids kit (Pillar Technologies; Hartland, Wis.). Wettability was evaluated using a static drop technique which involved placing a drop of surface tension liquid or water on the surface of the fabric and observing its ability to penetrate the fabric. Wicking was examined with 2-inch by 9-inch (about 5-cm by 23-cm) meltblown samples, with the longer direction of the sample being parallel with the machine direction. The sample was placed on a graduated sample holder and hung from a slide which was suspended over a reservoir containing a saline solution. The slide was lowered into the saline solution until 2.5 cm of the sample was below the surface of the solution. A timer was started and the position of the wicking fluid front was observed and recorded as a function of time over a 30-minute period. Simple wicking tests also were conducted with 1-inch by 9-inch (about 2.5-cm by 23-cm) samples by hanging the strip with about 0.25 inch (about 0.6 cm) immersed in a beaker of water and timing the vertical advance of the water front up the sample.

The filtration of a cationic dye, polystyrene nanoparticles, and cholera through the complex-coated meltblown fabric also was evaluated. A blue cationic dye from Keystone Aniline Corp. (Chicago, Ill.) was filtered through the fabric and the filtrate absorbance was measured with a Varian 2200 UV-Vis spectrophotometer. A Coulter N4MD sub-micron particle analyzer was used to detect the presence of 295 nm polystyrene particles or 255 nm amino-modified polystyrene particles (Seradyn, Indianapolis, Ind.) after filtering 4 ml of the particle suspension thorough a 25-mm diameter disk of the coated meltblown fabric.

Polyelectrolyte Complex Solutions on Film

The chitosan-PAA complexes formed clear, slightly viscous solutions. Complex solutions having molar ratios less than 20 were slightly cloudy, but uniform. Chitosan and PMA at a 1 percent concentration in 2 percent lactic acid were complexed with molar ratios of 20 and 10. The molar ratio 10 complex precipitated unless vigorous mixing was employed. The molar ratio 20 complex had negligible precipitation.

Preliminary experiments performed with a 0.6 percent solution of a complex formed from chitosan C and PAA B and having a molar ratio of 4 in 1.5 percent acetic acid had a solution surface tension of 56 dynes/cm. This solution gave a contact angle of 70° on polypropylene film but remained as a continuous coating when forced to spread; that is, it exhibited a receding contact angle of 0°. Thus, the complex was interfacially active and adsorbed onto the film surface to yield a zero interfacial tension for the complex solution. Accordingly, a nonretracting liquid film can be used as an indication of the presence of a surface-active complex on the surface of the film. This was demonstrated in an experiment where the above complex solution was mixed with uncomplexed chitosan in weight ratios of 1:1, 1:3, 1:6, and 1:12. Only the 1:12 mixture did not yield a retained liquid film. The advancing contact angle of water on the dried film of the molar ratio 4 complex was 65° and the receding contact angle was 30°. The advancing contact angle of the 62 dyne/cm Politest liquid which was needed to wet out a 1.0 osy (about 34 gsm) meltblown fabric treated with this complex was 30°. This shows that the air/fiber composite of the fabric needs to have a fiber contact angle of 30° or less to yield a composite contact angle less than 90°. Similar results were obtained with chitosan B and PAA B at a molar ratio of 3 in 2.5 percent lactic or acetic acid.

Complexes of chitosan A and PAA B with molar ratios of 130, 57, 28, 5.7, and 1 and at concentrations of 0.5 percent, 1 percent, and 2 percent had surface tensions of approximately 60 dynes/cm. The complex solution at a 0.2 percent concentration had a contact angle of 92° on polypropylene film. The addition of butanol (0.5 percent) decreased the contact angle to 85°. Hexanol (0.5 percent) did not totally dissolve, which resulted in inconsistent contact angle measurements ranging from 74° to 38°. Higher concentrations of complex had advancing contact angles that were estimated to be about 90° as well. The viscosity of these solutions interfered with their ability to spread and an equilibrium advancing contact angle might not have been achieved at the time of measurement. All solutions gave an immediate continuous liquid film on polypropylene and polyethylene films when forced to spread. However, in the case of complex solutions with a molar ratio greater than 10 and concentrations less than 1 percent (lower viscosity), the liquid film retracted within several minutes, yielding an uneven coating thickness. The 1 percent, molar ratio 3 complex had a contact angle less than 90° and resulted in a continuous coating that was retained after forced spreading on polypropylene and polyethylene films.

Polyelectrolyte Complex-Treated Film Studies

The presence and distribution of the complexes was determined by iodine staining and optical microscopy. Iodine staining of polypropylene films coated with the chitosan-PAA complex in acetic acid showed patchy orange areas, whereas the complex in lactic and 4-hydroxybutyric acids were more homogeneous. Coated polyethylene films were uniformly orange with the complex in all three types of acids. Oven-dried films (1 hr at 60° C.) had more homogeneous coatings than those dried in air, although oven heating caused the films to cud up at the edges.

Complex Coating Methods

The chitosan-PAA complexes having various molar ratios at 2 percent concentrations formed stable, continuous films on polypropylene and polyethylene films after forced spreading. Molar ratios of 150, 100, 50, 30, 20, and 10 of chitosan-PAA complexes in acetic acid provided slightly better coating on such films. Molar ratios of 50 and 20 of the complex at a concentration of 2 percent in lactic or 4-hydroxybutyric acids did not demonstrate significant differences in film coating. Although the addition of butanol, hexanol, and methanol to the complex solution decreased its surface tension, such addition resulted in a less stable liquid film after force spreading on polypropylene film. The presence of an alkanol apparently interfered with the adsorption of the complex at the film/solution interface.

As noted earlier, PAA A and C were received as sodium salts. When complexes were formed with chitosan and either polyelectrolyte, little precipitation occurred. However, the resulting complex solutions did not give nonretracting liquid films when spread, regardless of whether they were dried in the air, flow hood, or 40° C. oven. Acidifying these solutions with acetic acid permitted the formation of a continuous film. This phenomenon may be explained by the different distribution of ionic groups between chitosan and PAA, leading to some free acrylic acid groups in the complex. When the uncomplexed acid groups form sodium salts, the complexed blocks of chitosan do not become hydrophobic enough to promote adsorption. The chitosan-PMA complex at a 1 percent concentration spread easily on both polypropylene and polyethylene films; however, the viscosity of the solution caused it to retract and bead after several minutes.

The contact angles of water, dilute sulfuric acid, and dilute acetic acid on polypropylene and polyethylene films coated with a 2 percent chitosan-PAA complex in 1 percent acetic acid at molar ratios of 20 and 10 were approximately 50°, 25°, and 10°, respectively. The acetic acid appeared to dissolve and redistribute the complex coating. Contact angles of water and dilute sulfuric acid on polypropylene and polyethylene films coated with 2 percent chitosan-PAA complex in 1 percent lactic acid or 1 percent 4-hydroxybutyric acid at 50 and 20 molar ratios were approximately 20° and 10°, respectively. In view of the foregoing results, it is possible to tailor the contact angle by the use of a strong or weak acid to protonate the free chitosan amino groups.

Polyelectrolyte Complex-Treated Nonwoven Web Studies

As with the coated films, the presence and distribution of complex coatings on nonwoven fabrics were determined by iodine staining and optical microscopy. Iodine staining revealed that meltblown fabric samples exposed to the 0.7 percent chitosan-PAA complex solution had a thicker, more homogeneous coating than was obtained with the 0.2 percent complex solution. The fibers of complex-treated spunbond fabrics were stained orange, and webs of bright orange solids between and on fibers were observed. Staining showed that the complexes with solution concentrations of 2 percent, 1 percent, and 0.5 percent dissolved in 1 percent lactic or 4-hydroxybutyric acid at complex molar ratios of 50 and 20 applied via a dip and nip procedure were homogeneously coated on the fibers of the meltblown and spunbond fabrics. However, staining also indicated that nipping may have removed the complex from external fibers, i.e., fibers at the fabric surfaces. Nipped spunbond samples from the complex in acetic acid had orange internal fibers and white bond points and external fibers. Nipped spunbond samples from the complex in lactic and 4-hydroxybutyric acids had less color and solids on edges of fibers, but did not form webs like nonnipped samples. Oven-dried (4 hr at 60° C.) nonwoven fabrics looked very similar to air-dried fabric, but may have stained slightly lighter.

Vacuum extraction of molar ratio 20 complex solutions produced meltblown fabrics stained with dark orange areas of coating at the dots associated with the Buchner funnel holes. Staining of fabrics soaked during sonication at low power indicated that the coating was less uniform. Iodine staining did not differentiate between application methods involving heating or high power sonicating during soaking, normal soaking, or post-treatment with sulfuric acid or heat, and indicated a light, uniform coating for all samples.

Although ninhydrin was more specific in its detection of the complex, the spraying procedure tended to wash off excess of the molar ratio 20 complex and make it difficult to tell the location and homogeneity of the coating; consequently, use of this technique was limited. Ninhydrin staining of chitosan-PAA complex deposited on meltblown fabric by dipping or by dipping and nipping was medium purple. Staining of vacuum-extracted meltblown with the chitosan-PAA complex produced purple dots where the vacuum was strongest; samples which were not water washed were additionally light purple all over. Ninhydrin staining also showed a thick coating of the chitosan-PMA complex on meltblown fabric samples.

Scanning Electron Microscopy (SEM) showed that much thicker coatings on the fibers and in the interstitial areas were produced with higher concentrations (2 percent v. 1 percent and 0.5 percent) of the chitosan-PAA complex at a molar ratio of 20 in both 4-hydroxybutyric and lactic acids. The very high add-on from the preparation method resulted in occlusion of pore structures by excess complex which can easily be observed from the SEM photos (not shown). A lower molar ratio (20 v. 50) of the chitosan-PAA complex in either acid also appeared to provide a thick coating on the meltblown fabric but not on spunbond fabric. The complex in hydroxybutyric acid was shown to coat meltblown fabric more heavily than the complex in lactic acid; however, both appeared to have at least monolayer coverage on all films.

No significant differences in chitosan-PAA complex coatings were detected with X-ray photoelectron spectroscopy (XPS) for previously prepared samples that compared air and oven drying, meltblown and spunbond, molar ratios of 20 and 50, and before and after water soak, although significant differences in wettability were observed, as described later. The XPS results are summarized in Tables 1–5; in the tables, "H" represents 4-hydroxybutyric acid and "L" represents lactic acid, and control fabrics in Tables 3 and 5 were the fabrics per se, i.e., without the coating of nonstoichiometric polyelectrolyte complex.

TABLE 1

ESCA Data for 4-Hydroxybutyric Acid v. Lactic Acid

| Sample | Hydroxybutyric Acid | | Lactic Acid | |
| --- | --- | --- | --- | --- |
| | N/C | O/C | N/C | O/C |
| Meltblown Fabric | | | | |
| MR 20, air | 0.07 | 0.39 | 0.06 | 0.29 |
| MR 20, air, soak | 0.08 | 0.39 | 0.06 | 0.33 |
| MR 20, oven | 0.07 | 0.35 | 0.06 | 0.32 |
| MR 50, oven | 0.05 | 0.21 | 0.04 | 0.16 |
| MR 50, oven, soak | 0.05 | 0.25 | 0.04 | 0.24 |
| Spunbond Fabric | | | | |
| MR 20, air | 0.07 | 0.31 | 0.06 | 0.29 |
| MR 50, air | 0.07 | 0.28 | 0.05 | 0.25 |
| MR 50, air, soak | 0.07 | 0.30 | 0.06 | 0.28 |
| MR 50, oven | 0.06 | 0.28 | 0.04 | 0.19 |

TABLE 2

ESCA Data for Air v. Oven Drying

| Sample | Air Drying | | Oven Drying | |
| --- | --- | --- | --- | --- |
| | N/C | O/C | N/C | O/C |
| Meltblown Fabric | | | | |
| H, MR 20 | 0.07 | 0.39 | 0.07 | 0.36 |
| L, MR 20 | 0.06 | 0.29 | 0.06 | 0.32 |
| Spunbond Fabric | | | | |
| H, MR 50 | 0.07 | 0.28 | 0.06 | 0.28 |
| L, MR 20 | 0.06 | 0.29 | 0.07 | 0.34 |
| L, MR 50 | 0.05 | 0.25 | 0.04 | 0.19 |
| L, MR 50, soak | 0.06 | 0.28 | 0.06 | 0.26 |

TABLE 3

ESCA Data for Meltblown v. Spunbond

| Sample | Meltblown | | Spunbond | |
| --- | --- | --- | --- | --- |
| | N/C | O/C | N/C | O/C |
| H, MR 20, air | 0.07 | 0.39 | 0.07 | 0.31 |
| H, MR 50, oven | 0.05 | 0.21 | 0.06 | 0.28 |
| L, MR 20, air | 0.06 | 0.29 | 0.06 | 0.29 |
| L, MR 20, oven | 0.06 | 0.32 | 0.07 | 0.34 |
| L, MR 50, oven | 0.04 | 0.16 | 0.04 | 0.19 |
| L, MR 50, oven, soak | 0.04 | 0.24 | 0.06 | 0.26 |
| Control | 0.00 | 0.02 | 0.00 | 0.01 |
| Control, soak | 0.00 | 0.05 | 0.00 | 0.10 |

TABLE 4

ESCA Data for Molar Ratio 20 v. 50

| Sample | Molar Ratio 20 | | Molar Ratio 50 | |
| --- | --- | --- | --- | --- |
| | N/C | O/C | N/C | O/C |
| Meltblown Fabric | | | | |
| H, oven | 0.07 | 0.36 | 0.05 | 0.21 |
| L, oven | 0.06 | 0.32 | 0.04 | 0.16 |
| L, oven, soak | 0.06 | 0.36 | 0.04 | 0.24 |
| Spunbond Fabric | | | | |
| H, air | 0.07 | 0.31 | 0.07 | 0.28 |
| L, air | 0.06 | 0.29 | 0.05 | 0.25 |
| L, oven | 0.07 | 0.34 | 0.04 | 0.19 |

TABLE 5

ESCA Data for Before v. After Soak

| Sample | Before Soak | | After Soak | |
| --- | --- | --- | --- | --- |
| | N/C | O/C | N/C | O/C |
| Meltblown Fabric | | | | |
| H, MR 20, air | 0.07 | 0.39 | 0.08 | 0.39 |
| H, MR 50, oven[a] | 0.05 | 0.21 | 0.05 | 0.25 |
| L, MR 20, air | 0.06 | 0.29 | 0.06 | 0.33 |
| L, MR 20, oven | 0.06 | 0.32 | 0.06 | 0.36 |
| L, MR 50, oven[a] | 0.04 | 0.16 | 0.04 | 0.24 |
| Control | 0.00 | 0.02 | 0.00 | 0.05 |

TABLE 5-continued

ESCA Data for Before v. After Soak

| | Before Soak | | After Soak | |
|---|---|---|---|---|
| Sample | N/C | O/C | N/C | O/C |
| Spunbond Fabric | | | | |
| H, MR 50, air | 0.07 | 0.28 | 0.07 | 0.30 |
| L, MR 50, air[a] | 0.05 | 0.25 | 0.06 | 0.28 |
| L, MR 50, oven | 0.04 | 0.19 | 0.06 | 0.26 |
| Control | 0.00 | 0.01 | 0.00 | 0.10 |

[a]Wettability changed after soaking

The theoretical nitrogen/carbon (N/C) and oxygen/carbon (O/C) atom-percent ratios for a 20 molar ratio complex of chitosan and either PAA or PMA are 0.15 and 0.66, respectively. The highest N/C and O/C ratios obtained for chitosan-PAA samples (molar ratio of 20 in 4-hydroxybutyric acid) were 0.08 and 0.39, respectively. The ESCA results of 0.02 N/C and 0.12 O/C atom-percent ratios for a chitosan-PMA complex (molar ratio of 20 in lactic acid) were less than those measured for a chitosan-PAA complex, although they theoretically should be similar. No sodium was detected, despite neglecting to acidify the PMA which supposedly was in sodium salt form.

Another series of samples showed slightly greater amounts of complex were deposited from solutions having higher concentrations (2 percent>1 percent>0.5 percent) and for the complex prepared in 4-hydroxybutyric acid as compared to lactic acid. These results are summarized in Table 6.

TABLE 6

ESCA Data for MR 20 Chitosan-PAA
Coatings on Meltblown from Acid Solutions

| Conc. | Acid | N/C | N/C |
|---|---|---|---|
| 2 Percent | 4-Hydroxybutyric | 0.05 | 0.35 |
| 2 Percent | Lactic | 0.03 | 0.20 |
| 1 Percent | 4-Hydroxybutyric | 0.04 | 0.20 |
| 1 Percent | Lactic | 0.03 | 0.14 |
| 0.5 Percent | 4-Hydroxybutyric | 0.03 | 0.17 |
| 0.5 Percent | Lactic | 0.01 | 0.10 |

Thus, lower concentrations of complex do not provide as good fiber coverage as higher concentrations. This effect was observed with both acids studied.

Nonwoven Coating Methods

The prewetting of meltblown fabric with methanol produced slightly heavier, more homogeneous coatings. The addition of hexanol or butanol to the chitosan-PAA complex to decrease surface tension did not increase the ability of the complex solution to wet out the nonwoven. A corona pretreatment lowered the critical surface tension of wetting of the nonwoven fabric to approximately 60 dynes/cm and, therefore, faster, more homogeneous coating of the complex was expected. However, the soak time for the complex solution to completely wet the MB was not reduced.

Preparations with a heated complex solution (60° C.) took longer to wet out, even with pressure applied with a glass stir rod. Sonication during soaking quickly and evenly wet out the meltblown fabric. Lower molar ratio complex solutions (3 v. 20) also provided easier wet-out as expected because the higher amount of PAA in the complex provided more hydrophilic blocks and, accordingly, higher surface activity.

Vacuum extraction was difficult and slow with the 1 percent complex solution due to its high viscosity. A 1:2 dilution of the complex in water was still viscous, but was slowly vacuum extracted. A 1:10 dilution of the complex was suitable for vacuum extraction, which was only slightly slower than normal.

Wettability

Spunbond fabric was water wettable when treated with a 2 percent, molar ratio 20 complex dissolved in lactic acid solution. Spunbond fabric treated with 2 percent complex dissolved in 4-hydroxybutyric acid was not water wettable, but wet when the pH was adjusted to 3 with diluted sulfuric acid. Complex (2 percent) in acetic acid solution produced a coated spunbond fabric that was not wettable with water or sulfuric acid, but provided a critical surface tension of wetting (CSTW) of approximately 60 dynes/cm. Meltblown fabric was water wettable when coated with the 2 percent, 20 molar ratio complex, regardless of which hydroxy acid was used. This difference in wettability was the result of the difference in fiber surface fraction between the two nonwovens. (The wetting out of a textile is determined by the apparent contact angle which is the weighted sum of contact angles of the fiber and air surfaces.)

Higher concentrations of the nonstoichiometric polyelectrolyte complex produce better wettability. Although meltblown fabric was wettable when treated with 2 percent complex in a hydroxy acid, it was not water wettable following dip or dip/nip treatment with 1 percent or 0.5 percent complex solutions, with the exception of 1 percent complex in 4-hydroxybutyric acid. Lower molar ratios (3) of chitosan-PAA complex were less wettable, but still increased the CSTW of treated spunbond and meltblown fabrics to 62 dynes/cm; the data are presented in Table 7. Water dilutions of 2:1 and 3:1 of 2 percent chitosan-PAA complex solutions at various molar ratios produced less wettability for the treated spunbond fabric than the neat complex.

TABLE 7

CSTW of Spunbond Fabric
Coated with 2 Percent Chitosan-PAA

| Acid (1 Percent) | Molar Ratio | CSTW[a] |
|---|---|---|
| Lactic | 50 | >70[b] |
| | 20 | >70[b] |
| | 3 | 62 |
| 4-Hydroxybutyric | 50 | 60–64 |
| | 20 | 64–70 |
| Acetic | 150 | 50 |
| | 100 | 50–56 |
| | 50 | 50–56 |
| | 30 | 56–60 |
| | 20 | 60–66 |
| | 10 | 60–66 |

[a]Critical surface tension of wetting in dynes/cm
[b]Water wettable

Nipping fabrics saturated with complex solution with a laboratory wringer was necessary to provide greater wettability to the spunbond or meltblown fabric coated with the complexes in any of the three acids. Nipping distributed the complex better and removed some of the excess complex from the web. Oven-dried spunbond and meltblown fabrics had significantly less wettability or lower CSTW than those dried in the flow hood. This may be the result of the acid being volatilized from the sample and leaving the chitosan in the less hydrophilic nonionic state.

The nonwettable samples treated with 1 percent and 0.5 percent solutions of molar ratio 20 chitosan-PAA complex were soaked in water for 24 hours and were then found to be water wettable. Weight loss was measured following soaking; the results are summarized in Table 8

TABLE 8

Weight Add-on for MR 20
Chitosan-PAA Complex on Meltblown Fabric

| | | Weight Percent Add-on | |
|---|---|---|---|
| Conc. | Acid | Before Soak | After Soak |
| 2% | 4-Hydroxybutyric | 19[a] | — |
| 2% | Lactic | 11[a] | — |
| 1% | 4-Hydroxybutyric | 10[a] | — |
| 1% | Lactic | 6 | 2 |
| 0.5% | 4-Hydroxybutyric | 8 | 2 |
| 0.5% | Lactic | 3 | 1 |

[a]Water wettable

Although the XPS data of samples before and after soaking did not have significant differences (data not shown), there were differences between samples prepared with lower concentration solutions of complex. This indicated that low add-on obtained by preparation with low concentration solutions resulted in a very different coating from that obtained from removal of excess complex through soaking. Meltblown fabric treated with 1 percent chitosan-PMA complex in 2 percent lactic acid was not water wettable. However, water washing following preparation, similar to that needed with some chitosan-PAA samples, produced water wettability.

The 1 percent, molar ratio 3 chitosan-PAA complex coated on meltblown fabric with the dip/nip procedure and water soak were not water wettable, unlike the 1 percent, molar ratio 20 complex-treated meltblown fabric. At these lower molar ratios, the lower number of free chitosan amine groups may be responsible for the lack of water wettability. The molar ratio 3 complex did yield a CSTW of 60–62 dynes/cm with both dip and dip/nip preparations, and a CSTW of 64 dynes/cm following water soak. A post-treatment with dilute phosphoric acid produced water wettability; however, post-treatment with dilute hydrochloric or sulfuric acids did not increase wettability. This can be explained by the fact that hydrochloric acid is more volatile than the phosphoric acid. Although both phosphoric and sulfuric acids probably form crosslinks with the amine groups, the higher valency of the phosphoric acid can yield a net negative charge.

In spite of the faster, more uniform wet-out of fabrics coated with complex under sonication, these fabrics did not have significantly different wettability or CSTW. Heating during the soak produced wettability which was equal to that of samples soaked without heat. Vacuum extraction and post-treatment with sulfonation or heat of complex-treated samples that would otherwise have been water wettable, generated samples that were not water wettable.

Wicking

Meltblown fabrics treated with 2 percent complex in lactic acid and with 2 percent and 1 percent complex in 4-hydroxybutyric acid had high weight-percent add-ons (see Table 8). Vertical wicking tests were conducted with these water-wettable samples and only the lowest add-on sample (1 percent complex in 4-hydroxybutyric acid) wicked significantly (9 cm in 1 hour). The other high add-on samples wicked quickly to a maximum height (2–10 cm within 5 to 10 minutes) and did not wick any higher with additional time.

Meltblown fabrics treated with 1 percent and 0.5 percent complex in lactic acid and with 1 percent complex in 4-hydroxybutyric acid had lower weight-percent add-on levels (see Table 9). When these were soaked in water to produce wettability, they lost even more weight, but subsequently exhibited excellent wicking properties. Small scale wicking tests with water and saline solutions showed fast wicking of 12 cm in 5 minutes which continued to the top of the strip (22 cm) in 30 minutes; these results are summarized in Table 9. The wicking was reproducible for two additional tests of the same strip (data not shown). It is believed that the water soak helped redistribute the complex to yield more even microscopic distribution of complex on the fibers, especially on the outer fibers which nipping had a tendency to wipe off the complex. In the table, the data are wicking heights in cm for water unless otherwise indicated and "HA" represents 4-hydroxybutyric acid and "LA" represents lactic acid.

TABLE 9

Wicking Heights for Meltblown Fabrics
Coated with Chitosan-PAA Complex

| | Weight Percent Add-on of Complex | | | |
|---|---|---|---|---|
| Time (min) | 2.2 HA[a] | 10 HA[b] | 19 HA | 2.5 LA[c] |
| 5 | 10 | 6.5 | 7 | 12 |
| 15 | 12 | 9 | 10 | 18 |
| 30 | — | 10 | 10 | 21[d] |
| 60 | 21[d] | 10.5 | 10 | 21[d] |

[a]Washed, original add-on 5.5%, some unwetted areas
[b]Wicking with saline
[c]Washed, original add-on 3.7%, uniformly wetted
[d]Total height of sample Gelling Before the importance of good mixing and the relationship of volume and mixing intensity were identified, very stable gels that could not easily be applied to the nonwovens or films were often generated when the preparation of 2 percent chitosan-PAA complexes having molar ratios less than 10 was attempted. However, a 1 percent complex with a molar ratio of 3 was prepared that did not gel; it required low concentrations, i.e., 1 percent chitosan and 1 percent PAA, with very vigorous mixing in large volumes (100 ml). Smaller volumes and less vigorous mixing resulted in gelling. Higher molar ratio complexes dried on a glass slide also formed a gel with the addition of water.

As previously stated, samples with high complex add-on quickly wicked to a given height and stopped. It is believed that this phenomenon is due to gelling of the excess complex which obstructs the capillaries. Additional evidence for this hypothesis was provided by comparing the wet pick-up of complex-treated and surfactant-treated meltblown. The data are summarized in Table 10. The complex-treated meltblown fabrics absorbed 21 19, and 6 percent more water than surfactant-treated meltblown fabrics during subsequent soaks. Decreases in dry weight occurred for each respective soak; Table 11. In both tables, the surfactant was a polyethoxylated nonyl phenol (Triton® X-102, Rohm and Haas Company) and the complex was a molar ratio 20 chitosan-PAA complex deposited from a 1 percent solution in 4-hydroxybutyric acid.

TABLE 10

Wet Pick-up of Complex- and Surfactant-
Coated Meltblown Fabrics

| Coating | Soak | % Wet Gain | % Difference |
|---|---|---|---|
| Triton ® | 1 | 646 | — |
| Complex | 1 | 814 | 21 |
| Triton ® | 2 | 599 | — |
| Complex | 2 | 742 | 19 |
| Triton ® | 3 | 589 | — |
| Complex | 3 | 624 | 6 |

TABLE 11

Weight Loss of Soaked Meltblown Fabrics
Coated with Chitosan-PAA Complex

| Soak | Total Wt. (g) | Calculated Wt. Complex | % Wt. Loss From Original | Final % Add-on |
|---|---|---|---|---|
| 0 | 1.18 | 0.093 | — | 7.9 |
| 1 | 1.14 | 0.055 | 41 | 4.8 |
| 2 | 1.12 | 0.037 | 61 | 3.3 |
| 3 | 1.11 | 0.029 | 68 | 2.6 |

Durability

The coating, regardless of application method, was still present following a water soak after preparation and drying, but it was not durable to a water rinse immediately following application. Durability was demonstrated as samples retained their water wettability or increased CSTW following a 24-hour water soak; although some meltblown fabric samples showed increases in wettability and some spunbond fabric samples showed slight decreases in wettability. Soaking of the non-water wettable, lower add-on samples resulted in weight loss and provided wettability. Decreases in dry weight for each progressive soak occurred with a meltblown fabric that had an initial complex add-on of 8 percent (see Table 11). It appears that some complex is removed with each water soak and results in lower dry weight, nonetheless, the sample retains its ability to wet and often wicking is enhanced. This suggests that excess complex is removed by water washing, but that the complex adsorbed onto the polymer surface is stable.

Filtration

Meltblown fabric treated with chitosan-PAA complex was shown to scavenge an anionic dye used in the vertical wicking test from saline solution. The dye was observed to adsorb onto the nonwoven and to separate from the saline as the liquid wicked up the coated fabric. Chitosan provides the cationic characteristics for the adsorption. A filtration test using UV-VIS spectrophotometer measured a 30 percent decrease in dye concentration.

The filtration of polystyrene 300-nm particles was examined for 0.5 osy (about 17 gsm) meltblown fabric treated with 1 percent chitosan-PAA complex, having a molar ratio of 20, in 1 percent lactic acid. The particles were slightly anionic and were expected to be captured by the cationic chitosan. The results are summarized in Table 12.

TABLE 12

Filtration of Polystyrene Particles by
Coated Meltblown Fabric

| Sample | Counts/sec | No. Particles | % Decrease |
|---|---|---|---|
| Water | 772 | — | — |
| Particles | 15,400 | $2.5 \times 10^8$ | — |
| Uncoated Fabric | 15,700 | $2.5 \times 10^8$ | -1.9 |
| Heated soak | 16,250 | $2.6 \times 10^8$ | -5.3 |
| + rinse | 16,650 | $2.7 \times 10^8$ | -7.8 |
| Heated soak/nip | 15,500 | $2.5 \times 10^8$ | -0.6 |
| + rinse | 14,100 | $2.3 \times 10^8$ | 8.1 |
| Sonicate soak | 15,950 | $2.6 \times 10^8$ | -3.4 |
| + rinse | 15,400 | $2.5 \times 10^8$ | 0 |
| Sonicate soak/nip | 14,350 | $2.3 \times 10^8$ | 6.5 |
| + rinse | 14,350 | $2.3 \times 10^8$ | 6.5 |
| Particles | 17,000 | $2.7 \times 10^8$ | — |
| Normal soak | 17,700 | $2.8 \times 10^8$ | -4.0 |
| + rinse | 16,300 | $2.6 \times 10^8$ | 4.0 |
| Normal soak/nip | 15,300 | $2.5 \times 10^8$ | 9.6 |
| + rinse | 15,100 | $2.4 \times 10^8$ | 10.7 |
| Dip, post-$H_2SO_4$ | 18,300 | $2.9 \times 10^8$ | -7.3 |
| Dip/nip, post-$H_2SO_4$ | 16,900 | $2.7 \times 10^8$ | 0.6 |
| + rinse | 15,500 | $2.5 \times 10^8$ | 9.0 |
| Post-heat | 18,950 | $3.0 \times 10^8$ | -11.0 |
| + rinse | 19,100 | $3.1 \times 10^8$ | -11.9 |
| Post-heat, nip | 15,900 | $2.6 \times 10^8$ | 6.2 |
| + rinse | 15,800 | $2.6 \times 10^8$ | 6.8 |

Meltblown fabric treated by the normal dip/nip procedure followed by a water wash provided the most particle adsorption with about a 10 percent decrease. Samples prepared with heat or sonication as a part of the dip/nip method produced about a 68 percent decrease in particles.

Post-treatment of the complex-coated meltblown fabric with acids was hypothesized to increase the cationic characteristics of the chitosan and therefore enhance the ability to adsorb anionic polystyrene particles. Hydrochloric and sulfuric acids slightly increased the ability of the coated fabric to adsorb the particles. Phosphoric acid notably increased the ability of the coated fabric to adsorb cationic amino-modified polystyrene nanoparticles with a 24 percent decrease in particles. The data are summarized in Table 13.

TABLE 13

Filtration of Polystyrene Particles by
Coated Meltblown Fabric

| Sample | Counts/sec | No. Particles | % Decrease |
|---|---|---|---|
| Particles (PS) | 17,400 | $2.8 \times 10^8$ | — |
| MR 20, post-HCl | 14,900 | $2.4 \times 10^8$ | 13.5 |
| MR 3, post-HCl | 15,950 | $2.6 \times 10^8$ | 8.0 |
| MR 3, post-$H_3PO_4$ | 16,250 | $2.6 \times 10^8$ | 6.3 |
| Amino-modified PS | 17,850 | $2.9 \times 10^8$ | — |
| MR 3, post-$H_3PO_4$ | 13,450 | $2.2 \times 10^8$ | 23.7 |

Cholera has been shown to accumulate on the chitin exoskeletons of zooplankton. Chitosan is the aminated form of chitin. Meltblown fabrics treated with a chitosan-PAA complex were tested at the University of Florida for cholera filtration. A 30 percent decrease in cholera was obtained with the complex-treated fabric.

Chitosan-Pectin Complex

Chitosan in 1 percent lactic acid was complexed with apple pectin at a 1 percent concentration with a molar ratio of 20 and 10. Both complexes separated out of solution. The molecular weight of the pectin usually is between 20,000 and 400,000 daltons which makes it too large to satisfactorily be a second polyelectrolyte on the 70,000-dalton molecular weight chitosan first polyelectrolyte. A betaelimination reaction to decrease the molecular weight of the pectin was attempted unsuccessfully by increasing the pH to 6 and heating, then sonicating for 5 minutes. A 20 molar ratio complex with chitosan was again prepared, but the complex still precipitated.

Summary

The data in this example demonstrate that the use of acids of different volatilities and strengths during the preparation of the solutions of chitosan and its PAA complexes, or during post-treatments of coatings present on a substrate, generated coatings with a range of contact angles and wettability levels. Acetic acid, which is highly volatile, gave complexes that were less wettable, whereas less volatile hydroxy acids made more wettable complex coatings due to a higher level of protonation of the chitosan amino groups. The wettability of complex-coated nonwovens also was affected by the coating distribution. Higher concentration complex solutions produced thicker, more uniform coatings which were water wettable. For samples prepared with lower concentrations, a subsequent water soak may be useful, leading to a redistribution and more homogeneous distribution of the complex coating which, in turn, resulted in excellent wettability and wicking. Lower molar ratios of chitosan-PAA in the complex were shown to produce more uniform coatings and were expected to be more durable; however, they provided less wettability due to fewer free ammonium groups in the chitosan. Wicking was affected by the complex add-on level. Higher add-on coatings blocked the interstitial spaces and stopped capillary flow, presumably when gels were formed by the complex. Low add-on coatings provided rapid vertical wicking. Preliminary filtration efforts showed some success in the removal of both cationic and anionic nanoparticles. The chitosan in the complex was positively charged which allowed for the capture of anionic polystyrene particles. Post-treatment with phosphoric acid provided a negative charge on the complex for filtration of cationic particles. Some reduction of cholera also was demonstrated with chitosan-PAA coated meltblown fabric.

EXAMPLE 2

This example and those which follow illustrate the preparation of a substrate coated with a polyelectrolyte complex prepared from a strong cationic first polyelectrolyte and a weak anionic second polyelectrolyte. In this example, the first polyelectrolyte was poly(diallyl dimethyl ammonium chloride) (PDDAC) from Aldrich Chemical Company, Milwaukee, Wis., with a molecular weight of 240,000 daltons. The second polyelectrolyte was poly(acrylic acid) (PAA) from Polyscience, Inc., Washington, Pa., with a molecular weight of 5,000 daltons.

PDDAC, 2.0 g of a 20 percent aqueous solution, was diluted to 30.0 g with water to yield a 1.33 percent solution and homogenized by magnet stirring for 2 hours. PAA, 0.4 g of a 50 percent aqueous solution was added to 11.6 g water to yield a 1.67 percent solution. To the PDDAC solution was added 6.0 g of the PAA solution with vigorous stirring using a Janke & Kunkel Ultra-Torrax T25 turbomixer (Staufen, Germany) at 8000 rpm. The resulting solution developed a stable foam on the surface which was indicative of the formation of a surface-active, nonstoichiometric polyelectrolyte complex. The concentration of the complex in the solution was 1.39 percent. The molar ratio of first polyelectrolyte repeat units to second polyelectrolyte repeat units in the complex was calculated to be 1.8. The solution of the polyelectrolyte complex was coated onto glass and a polypropylene film. The solution had to be forced spread on the polypropylene film. Some retraction of the liquid film did occur on the film during drying, due partly to the low viscosity of the solution. The immediate advancing contact angle of water on the dried complex coating on the film was 150. The solution was concentrated to 2.5 percent, 0.5 percent hexanol was added to reduce the surface tension, and two pieces of 0.5 ounce per square yard or osy (about 17 grams per square meter or gsm) of a polypropylene meltblown nonwoven web were immersed in the solution which was observed to wet out the nonwoven web slowly. The webs were nipped in an Atlas laboratory wringer at a pressure of 30 lbs (about 13.6 kg) and hung to air dry. Drops of water placed on the dried nonwoven webs were observed to spontaneously enter the nonwoven structure and rapidly wick within the structure. Pieces of nonwoven hung vertically and contacted with water also showed a rapid vertical wicking.

EXAMPLE 3

The procedure of Example 2 was repeated in order to prepare a series of PDDAC and PM nonstoichiometric polyelectrolyte complexes. The series was prepared by adding a dilute PAA solution (1.7 g of 0.25 percent, 1.9 g of 0.45 percent, and 2.5 g of 0.86 percent solutions, respectively) to 10 g of a 1 percent PDDAC under turbomixing as described in Example 2. The amounts and concentrations (abbreviated as "Conc." in all tables) of the PAA solutions and the resulting molar ratios of the resulting nonstoichiometric polyelectrolyte complexes are given in Table 14.

TABLE 14

Summary of PDDAC-PAA Nonstoichiometric Complexes

| AMOUNT (G) | CONC. (%) | MOLAR RATIO |
|---|---|---|
| 1.7 | 0.25 | 10 |
| 1.9 | 0.46 | 5 |
| 2.5 | 0.86 | 2 |

The surface tension of the molar ratios 10 and 5 complex solutions were 59 and 55 dynes/cm, respectively. Some precipitate was observed to form in the molar ratio 2 complex solution. Forced spreading of these complex solutions onto polypropylene and polyethylene films gave, in all cases, wetting liquid films indicative of a zero receding contact angle and thus an adsorption of complex at the film-solution interface. Evaluation of the dried films showed homogeneous coatings on the polyethylene films but dendrimeric coatings on the polypropylene films. This apparent difference between the coatings on the two types of films also was reflected in the contact angle of water which was 10°–15° on the polyethylene films and 45°–70° on the PP film. No other differences between the different complexes were observed.

EXAMPLE 4

Nonstoichiometric polyelectrolyte complexes between the PDDAC described in Example 2 and sodium polyacrylate (SPA) were investigated. Three 40 percent stock solutions of SPA having molecular weights of 3,000, 10,000, and 20,000 daltons, respectively, were obtained from Polyscience, Inc. The measured pH's of these stock solutions were 7, 3, and 8, respectively. The SPA stock solutions were diluted to 0.3 percent with water. To 10 g of a 1 percent solution of PDDAC were added 2.0 g and 4.0 g, respectively, of the 0.3 percent SPA solutions under turbomixing as described in Example 1 to yield nonstoichiometric polyelectrolyte complexes with repeat unit molar ratios of 10 and 5, respectively. The complex solutions with the 3,000-dalton molecular weight SPA were clear, those with the 10,000-dalton molecular weight SPA were slightly turbid, and those with the 20,000-dalton molecular weight SPA were opalescent.

Only the complex solutions formed with the 10,000-dalton molecular weight SPA gave wetting liquid coatings after forced spreading on polypropylene and polyethylene films, indicative of the formation of an interfacially active complex. As already noted, the pH of the complex solution was approximately 3. Because of the low pH, it is highly likely that the poly(acrylic acid) was predominantly in the acid form. The addition of dilute acetic acid to the other two complex solutions to a pH of about 3 also allowed these solutions to yield good coatings on the polyolefin films.

EXAMPLE 5

A series of complexes with repeat unit molar ratios of 10, 4, 3, 2.5, 2.25 and 1.75 was made as described in Example 4 by adding increasing amounts of a 2 percent aqueous solution of PAA (obtained by adding 10 M hydrochloric acid to a solution of SPA having a molecular weight of 3,000 daltons until a pH of 3 was obtained) and the 2 percent solution of SPA from which the PAA was formed, respectively, to a 1 percent PDDAC solution under turbomixing as described in Example 2. Only the complex solutions made with PM gave wettable coatings on polyethylene films after forced spreading.

EXAMPLE 6

The procedure of Example 4 was repeated to prepare a series of nonstoichiometric polyelectrolyte complexes having molar ratios of the repeat units of 10, 7, 4, 3 and 2.5, respectively. The second polyelectrolyte was the solution of SPA having a molecular weight of 10,000 daltons and a pH of 3. All of the resulting nonstoichiometric polyelectrolyte complexes gave wettable coatings after forced spreading on polyethylene and polypropylene films. However, the complex solutions having the higher molar ratios (10 and 7) beaded on the polypropylene film during drying.

Examples 4, 5, and 6 suggest that the nonstoichiometric polyelectrolyte complexes formed with PDDAC as the first polyelectrolyte and having an excess of PDDAC repeat units, and with PAA as the second polyelectrolyte, need to have the acid groups not involved in complex formation in a nonionized form in order to give a complex which will adsorb onto hydrophobic polymer surfaces. Although the PAA repeat units are fewer in number than the PDDAC repeat units, some of the acid groups of the PAA can remain uncomplexed due to the differences in distance between the charged groups of the two polymers.

EXAMPLE 7

This example, which followed the procedure of Example 2, employed as the first polyelectrolyte poly(methacryl oxyethyl trimethyl ammonium bromide) (PMOTAB) from Polyscience, Inc. It was available with two different molecular weights, i.e., 50,000 and 200,000 daltons, respectively. The second polyelectrolyte was the 10,000-dalton molecular weight SPA described in Example 4.

Solutions containing 2 percent of PMOTAB and SPA, respectively, were prepared. To the 2 percent, 200,000-dalton PMOTAB solution was added drop-wise 0.564 g of the 2 percent SPA solution under turbomixing to give a nonstoichiometric polyelectrolyte complex having a repeat unit molar ratio of 10. Some foaming was observed during the mixing. The resulting solution was clear and gave good coatings on glass and on both polypropylene and polyethylene films after forced spreading. An additional 0.579 g of the SPA solution was added to the solution of the complex already formed to convert the complex to one having a repeat unit molar ratio of 5. A foam more stable than that previously observed was formed during the turbomixing. Some fine precipitate also was observed. The resulting complex solution also gave good coatings on polypropylene and polyethylene films. The addition of an additional 0.760 g of the SPA solution to give a complex having a molar ratio of 3 led to gel formation. Contact angle measurements with water on the coatings of the 10 and 5 molar ratio complexes gave advancing contact angles of 20°–250 on glass, 25°–30° on polypropylene films, and 20°–40° on polyethylene films.

A similar series of complex solutions were prepared using the 50,000-dalton PMOTAB. Again, 0.569 g of the 2 percent SPA solution was added to 20 g of the 2 percent PMOTAB solution while stirring with a glass rod to yield a complex having a molar ratio of 10. A precipitate formed. Attempts to redissolve the precipitate by turbomixing were not successful. The solution did not give wettable coatings on polypropylene and polyethylene films. However, the addition under turbomixing of sufficient SPA solution to yield a complex having a molar ratio of 3.6 resulted in a complex solution which gave good wettable coatings on glass and polypropylene and polyethylene films. The advancing contact angle for water on all substrates was less than 10°.

EXAMPLE 8

The procedure of Example 7 was repeated, except that the first polyelectrolyte was poly(butylacrylate-methacryl oxyethyl trimethyl ammonium bromide) (80-20) (PBAMOTAB) having a molecular weight of 50,000 daltons (Polyscience, Inc.). As in Example 7, nonstoichiometric polyelectrolyte complex solutions having molar ratios of 10 and 5 were prepared under turbomixing. Both complex solutions gave wettable coatings on polypropylene and polyethylene films. The measured advancing contact angles of water on the dried coatings were 5°–8° on polypropylene and 5° on polyethylene.

EXAMPLE 9

The procedure of Example 7 was repeated, except that the first polyelectrolyte was N-vinylpyrrolidone/ dimethylaminoethyl methacrylate quarternized copolymer, (COQUAT) from Scientific Polymer Products (no molecular weight was provided by the supplier) and PAA having a molecular weight of 5,000 daltons (Example 2). The surface tension of a 2 percent solution of COQUAT was 66.6 dynes/cm. The solution beaded when forced spread on polyethylene and polypropylene films. However, the addition of 0.2 g of the 2 percent PAA solution to 20 g of the 2 percent COQUAT solution resulted in a nonstoichiometric polyelectrolyte complex with a molar ratio of 17 (calculated on the copolymer) which yielded good wettable coatings on both polypropylene and polyethylene films. The measured advancing contact angles of water on the dried coatings were 20°–25°.

EXAMPLE 10

This example illustrates the preparation of a substrate coated with a polyelectrolyte complex prepared from a weak anionic first polyelectrolyte and a weak cationic second polyelectrolyte. Two poly(acrylic acid) first polyelectrolytes (PAA) were used. The first had a molecular weight of 50,000 daltons and the second had a molecular weight of 750,000 daltons. The second polyelectrolyte was polyethyleneimine (PEI) from Polyscience, Inc., having a molecular weight of 20,000 daltons.

A 2 percent PEI solution, 1.15 g, was added drop-wise to 20 g of a 2 percent solution of the 50,000-dalton PAA. A thread-like precipitate was formed when magnetic stirring was used during the addition. Repeating the process separately with 0.5 g and 1.0 g of the PEI solution with turbo mixing as described in Example 2 led to foaming and the formation of slightly turbid solutions containing a nonstoichiometric polyelectrolyte complex having molar ratios of 23 and 11, respectively. Both complex solutions gave good coatings when spread on polyethylene and polypropylene films. The dried films gave advancing contact angles with water of 10°–15°.

A 0.5 percent solution was made with the 750,000-dalton molecular weight PAA, since higher concentrations gave very viscous solutions. The addition of 0.5 g of a 2 percent PEI solution under turbomixing gave a slightly turbid solution with a complex with the ratio of 23 which gave good coatings on both polyethylene and polypropylene films. The dried films showed a contact angle of 15–20° with water.

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of coating a surface of a substrate composed of a hydrophobic polymer, which method comprises:
   providing a solution of a first polyelectrolyte having a first molecular weight and ionizable groups with a first latent charge;
   providing a solution of a second polyelectrolyte having a second molecular weight and ionizable groups with a second latent charge;
   mixing the solution of the first polyelectrolyte and the solution of the second polyelectrolyte in amounts which are selected to give a ratio of the number of ionizable groups in the first polyelectrolyte to the number of ionizable groups in the second polyelectrolyte of at least about 2, and under conditions adapted to result in the formation of a nonstoichiometric polyelectrolyte complex; and
   contacting the surface of the substrate with a solution of the nonstoichiometric polyelectrolyte complex under conditions sufficient to result in the coating of the surface of the film with the nonstoichiometric polyelectrolyte complex;
   wherein:
   the second latent charge is opposite the first latent charge; and
   the first molecular weight is at least about 40,000 daltons and at least about 2 times the second molecular weight.

2. The method of claim 1, in which the substrate is a film.

3. The method of claim 1, in which the ratio of the number of ionizable groups in the first polyelectrolyte to the number of ionizable groups in the second polyelectrolyte is in a range of from about 2 to about 150.

4. The method of claim 3, in which the ratio of the number of ionizable groups in the first polyelectrolyte to the number of ionizable groups in the second polyelectrolyte is in a range of from about 5 to about 50.

5. The method of claim 1, in which the hydrophobic polymer is a polyolefin.

6. The method of claim 5, in which the polyolefin is a polyethylene or a polypropylene.

7. The method of claim 1, in which the first polyelectrolyte is a weak polyelectrolyte and the second polyelectrolyte is a weak polyelectrolyte.

8. The method of claim 1, in which the first polyelectrolyte is a strong polyelectrolyte and the second polyelectrolyte is a weak polyelectrolyte.

9. The method of claim 1, in which the first polyelectrolyte is a weak polyelectrolyte and the second polyelectrolyte is a strong polyelectrolyte.

10. The method of claim 1, in which first molecular weight is at least about 3 times the second molecular weight.

11. The method of claim 1 which further comprises drying the coating of the nonstoichiometric polyelectrolyte complex on the surface of the substrate.

12. The method of claim 1, which further comprises crosslinking the coating of the nonstoichiometric polyelectrolyte complex on the surface of the substrate.

13. A method of coating surfaces of fibers of which a fibrous web is comprised, which fibers are composed of a hydrophobic polymer, the method comprising:
   providing a solution of a first polyelectrolyte having a first molecular weight and ionizable groups with a first latent charge;
   providing a solution of a second polyelectrolyte having a second molecular weight and ionizable groups with a second latent charge;
   mixing the solution of the first polyelectrolyte and the solution of the second polyelectrolyte in amounts which are selected to give a ratio of the number of ionizable groups in the first polyelectrolyte to the number of ionizable groups in the second polyelectrolyte of at least about 2, and under conditions adapted to result in the formation of a nonstoichiometric polyelectrolyte complex; and
   contacting the surfaces of the fibers with a solution of the nonstoichiometric polyelectrolyte complex under conditions sufficient to result in the coating of the surfaces of the fibers with the nonstoichiometric polyelectrolyte complex;
   wherein:
   the second latent charge is opposite the first latent charge; and
   the first molecular weight is at least about 40,000 daltons and at least about 2 times the second molecular weight.

14. The method of claim 13, in which the ratio of the number of ionizable groups in the first polyelectrolyte to the number of ionizable groups in the second polyelectrolyte is in a range of from about 2 to about 150.

15. The method of claim 13, in which the ratio of the number of ionizable groups in the first polyelectrolyte to the number of ionizable groups in the second polyelectrolyte is in a range of from about 5 to about 50.

16. The method of claim 13, in which the hydrophobic polymer is a polyolefin.

17. The method of claim 16, in which the polyolefin is a polyethylene or a polypropylene.

18. The method of claim 13, which further comprises crosslinking the coating of the nonstoichiometric polyelectrolyte complex on the surface of the film.

19. The method of claim 13, in which the fibrous web is nonwoven web.

20. The method of claim 19, in which the nonwoven web is a meltblown web or a spunbond web.

21. A coated substrate comprising:

a substrate comprised of a hydrophobic polymer; and a substantially uniform coating of a nonstoichiometric polyelectrolyte complex on a surface of the substrate;

wherein:

the polyelectrolyte complex is comprised of a first polyelectrolyte having a first molecular weight and ionizable groups with a first latent charge, and a second polyelectrolyte having a second molecular weight and ionizable groups with a second latent charge;

the second latent charge is opposite the first latent charge;

the ratio of the number of ionizable groups in the first polyelectrolyte to the number of ionizable groups in the second polyelectrolyte is at least about 2; and the first molecular weight is at least about 40,000 daltons and at least about 2 times the second molecular weight.

22. A fibrous web comprising:

fibers composed of a hydrophobic polymer; and a substantially uniform coating of a nonstoichiometric polyelectrolyte complex on the surfaces of the fibers;

wherein:

the polyelectrolyte complex is comprised of a first polyelectrolyte having a first molecular weight and ionizable groups with a first latent charge, and a second polyelectrolyte having a second molecular weight and ionizable groups with a second latent charge;

the second latent charge is opposite the first latent charge;

the ratio of the number of ionizable groups in the first polyelectrolyte to the number of ionizable groups in the second polyelectrolyte is at least about 2; and the first molecular weight is at least about 40,000 daltons and at least about 2 times the second molecular weight.

23. A filtration medium which comprises the coated web of claim 22.

* * * * *